Figure 1:
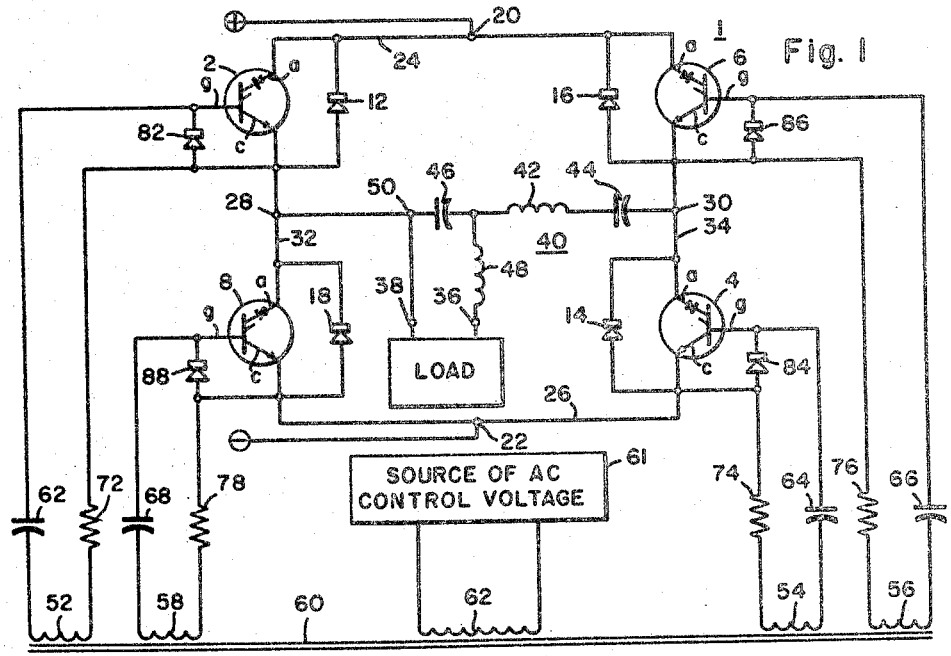

Jan. 14, 1964   A. E. RELATION ET AL   3,118,105
INVERTER USING DISCONTINUOUS CONTROL TYPE VALVES
Filed Dec. 15, 1961

WITNESSES
John E. Healey, Jr.
Leon M. Garman

INVENTORS
Alfred E. Relation &
Robert W. Lucky
BY
John L. Stoughton
ATTORNEY

United States Patent Office 3,118,105
Patented Jan. 14, 1964

---

3,118,105
INVERTER USING DISCONTINUOUS CONTROL TYPE VALVES
Alfred E. Relation, Ellicott City, Md., and Robert W. Lucky, Newark, N.J., assignors to Westinghouse Electric Corporation, East Pittsburgh, Pa., a corporation of Pennsylvania
Filed Dec. 15, 1961, Ser. No. 159,694
1 Claim. (Cl. 321—45)

This invention relates to power inverting apparatus and more particularly to such an apparatus which utilizes discontinuous type electric valves.

Many applications of power inverters require a sine wave output voltage. The utilization of electric valves operating in their switching mode inherently results in a square wave output voltage. Therefore, a filter section is often resorted to convert the square wave into a sine wave which is then transmitted to a load. The use of controlled rectifier type devices, which are effective to control the initiation of current flow therethrough but are ineffective to interrupt a large current flow therethrough once it has been established, introduces the additional problem of turn-off of the valve. Several methods have been developed to accomplish turn-off of such discontinuous control type valve such as by commutation, by shunting, and by interruption. These techniques impose undesirable limitations on the inverter capabilities and furthermore these inverters cannot readily handle large reactive loads without power factor correction.

It is an object of this invention to provide a filter for an inverter in which the filter which converts the square wave output voltage of the inverter into a sine wave voltage, also provides a leading power factor of current flow between the inverter and filter whereby current flow through the inverter valves will terminate and reverse prior to the reversal of the voltage at the load.

Another object of this invention is to provide, in such an inverter filter combination, asymmetric current flow devices connected in anti-parallel with the discontinuous type control valve to carry a current during the interval between the time that the current goes to zero and the load inverter voltage goes to zero.

Another object of this invention is to provide such a filter embodying series resonant circuits which are tuned to resonant at a frequency above the output frequency of the inverter.

Another object of the invention is to provide a filter having a voltage transfer function or regulation which is independent of load.

A further object of this invention is to provide such a filter which will pass the fundamental frequency of the output voltage supplied by the inverter but which will highly attenuate harmonics of this fundamental frequency so that the wave form of the load voltage and current approaches a sine wave.

Figure 2:
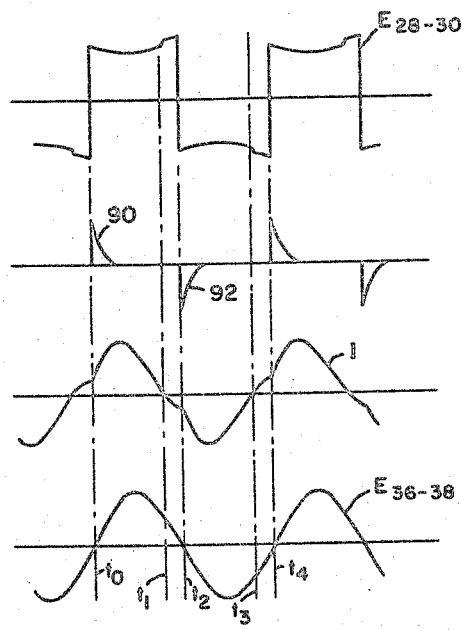

Other objects of this invention will be apparent from the description, the appended claims and the drawings in which drawings:

FIGURE 1 is a schematic view of an inverter and load combination embodying the invention; and, FIG. 2 is a view of various of the voltage and current waves of the inverter and filter.

Referring to the drawings by characters of reference, the numeral 1 indicates generally an inverter of the bridge type provided with electric valves 2, 4, 6 and 8. Each of these valves is illustrated as being a silicon controlled rectifier and provided with an anode $a$, a cathode $c$, and a gate $g$, connected in anti parallel with the anode and cathode of each of the valves 2, 4, 6 and 8 are rectifiers 12, 14, 16 and 18. As will be set forth more clearly below these rectifiers or diodes will conduct the flow of reactive current between the time that the valves 2, 4, 6 and 8 become non-conductive and the time that they reconduct.

Unidirectional power from a suitable source, not shown, is supplied to the input terminals 20 and 22 which are connected by means of conductors 24 and 26, respectively, to the anodes $a$ of the valves 2 and 6 and the cathodes $c$ of the valves 4 and 8. The alternating current output terminals 28 and 30 are connected respectively by conductors 32 and 34 which respectively connect the anode $a$ and cathode $c$ of the valves 8 and 2 and cathode $c$ and anode $a$ of the valves 6 and 4.

A filter network generally designated 40 is connected intermediate the output terminals 28 and 30 and is provided with load terminals 36 and 38. The network 40 comprises an inductor 42 and a capacitor 44 connected in series circuit with each other and in series with a second capacitor 46; the entire network being connected between the output terminals 28 and 30. An inductor 48 is connected between the common point of the inductor 42 and capacitor 46 and the load terminal 36. The other load terminal 38 is directly connected to the common terminal 50 of the capacitor 46 and the inverter output terminal 28.

Conduction of the valves 2, 4, 6 and 8 is controlled from a plurality of secondary windings 52, 54, 56 and 58 of a transformer 60 having a primary winding 62 which is energized from a suitable source of alternating control voltage 61 which alternates at the desired output frequency of the inverter 1. One terminal of each of the windings 52, 54, 56 and 58 is connected to the gates $g$ of the respective valves 2, 4, 6 and 8 through capacitors 62, 64, 66 and 68 respectively. The other terminal of each of the windings 52, 54, 56 and 58 is connected to the cathode of the respective valves through resistors 72, 74, 76 and 78. Diodes 82, 84, 86, and 88 are shunt connected between the cathode and gates of each of the valves 2, 4, 6 and 8 respectively and prevent any substantial buildup of voltage in a direction tending to pass current from the cathode to the gate.

Generically, the controlled rectifier valves 2, 4, 6 and 8 may be of any suitable type. Of the valves now available, the discontinuous control semiconductor type are presently preferred. With this type of valve, the application of a predetermined current between the gate and cathode thereby causes them to become conductive and as long as current above a predetermined magnitude flows they will remain conductive even though the initiating voltage applied between the gate and cathode is removed.

The windings 52, 54, 56 and 58 are phased so that at one half cycle of the voltage applied to the winding 62 of the transformer 60 the output voltage of the windings 52 and 54 energizes the gates of the valves 2 and 4 to render these valves conducting and at the opposite half cycle, of the voltage applied to the winding 62, the output voltage of the windings 56 and 58 energize the gates of the valves 6 and 8 to render these valves conducting. With this arrangement the valves 2, 4, 6 and 8 operate in the switching mode and a substantially rectangular voltage wave is applied between the terminals 28 and 30. This voltage wave is shown in FIG. 2 and identified as $E_{28-30}$.

The filter 40 is designed so that it will resonate at a frequency somewhat higher than the frequency supply 61. The sinusoidal voltage wave appearing at the filter terminals 36 and 38 is illustrated in FIG. 2 and identified as $E_{36-38}$. The curve I represents the current flow through the inverter 1. The filter 40 acts as a series resonant circuit and is tuned to resonate slightly above the desired output frequency of the inverter 1.

A suitable filter is illustrated in FIG. 1 in which the values of the various elements may be selected such that the capacity $C_1$ of the capacitor 44 and the capacity $C_2$ of the capacitor 46, in farads, may be expressed as follows:

$$C_1 = \frac{1}{6R_0W_d}$$

and $$C_2 = \frac{1}{3R_0W_d}$$

The inductance $L_1$ of the inductor 42 and $L_2$ of the inductor 48, in henrys may be expressed as follows:

$$L_1 = \frac{9R_0}{2W_d}$$

$$L_2 = \frac{R_0}{W_d}$$

where $W_d$ is the output frequency of the inverter 1 and $R_0$ the magnitude of the load 61 is the magnitude of the load impedance in ohms multiplied by a constant K $$R_0 K \sqrt{(W_d L)^2 + R^2}$$

where L is the inductance of the load in henrys, R is the resistance of the load in ohms, and K is a constant.

When K is unity the power factor of the apparent power supplied to the filter 40 is unity. As K is increased above unity the power factor of the apparent power supplied by the inverter 1 to the filter 40 becomes leading which, as will be made clear below, is desirable to insure commutation even though the load characteristics vary during operation and to render the inverter and its network useful with a number of networks which may vary somewhat from the theoretical load used in designing the filter 40 in ohms.

Such a filter has a voltage transfer function or regulation substantially independent of load so that the voltage appearing between the load terminals 36 and 38 will remain substantially constant irrespective of the load current. Such a filter will attenuate the harmonics of the fundamental frequency generated by the inverter.

It is believed that the remainder of the structure may be best described by reference to the operation which is as follows: Assuming an interval $t_0$ (FIG. 1) in which the alternating control voltage has just reversed in a direction to energize the windings 52 and 54 and provide voltage pulses 90 at the gates $g$ of the valves 2 and 4. These pulses cause current to flow between the gates $g$ and cathodes $c$ of the valves 2 and 4 and they become conducting to apply a voltage $E_{28-30}$ to the output terminals 28 and 30. A current I then flows from the input terminal 20 through the valve 2, the filter 40, the load and the valve 4 back to the other input terminal 22. Due to the filter characteristics, the current increases and then decreases as represented by the portion of the curve I between the times $t_0$ and $t_1$. At the time $t_1$, the current reach a zero value and since the conducting gate voltage 90 is not present, valves 2 and 4 will become non-conducting. At the time $t_1$, the current will reverse as shown by the portion of the current curve I intermediate the times $t_1$ and $t_2$ and will flow from the load and filter network through the rectifiers 12 and 14 back to the source. At the time $t_2$ the output voltage applied at the terminals 36 and 38 will become zero. At this time ($t_2$) the control voltage applied to the transformer 60 will reverse and the windings 56 and 58 will be energized to provide current pulses 92 and current will flow through the gates $g$ to the cathodes $c$ of the valves 6 and 8 to render these valves conducting. Upon conduction of valves 6 and 8 current will flow from the input terminal 20 through the valve 6, the filter 40, the load and the valve 8 to the output terminal 22. This current is illustrated by the portion of the curve I appearing between the time $t_2$ and $t_3$. At the time $t_3$, the current will again go to zero and the valves 6 and 8 will become non-conducting. During the interval $t_3$—$t_4$, the current will reverse and will flow from the filter 40 and load through the diodes 16 and 18 back to the current source. At the time $t_4$, the output voltage between the terminals 36 and 38 will reverse as well as the voltage applied to the control transformer 60 and the valves 2 and 4 will again be rendered conducting. The alternate conduction of valves 2 and 4, the rectifiers 12 and 14, the valves 6 and 8 and the rectifiers 16 and 18 will continue until such time as the operation of the inverter 1 is discontinued.

Although the invention has been described with reference to a single embodiment thereof, numerous modifications are possible and it is desired to cover all modifications falling within the spirit and scope of the invention.

What is claimed and is desired to be secured by United States Letters Patent is as follows:

In an inverting system, a pair of output terminals, a pair of semiconductor valves, means alternately rendering said valves conducting at a first frequency, a pair of rectifiers, means connecting a first of said rectifiers in anti-parallel with a first of said valves and a second of said rectifiers in anti-parallel with a second of said valves, a first current supplying circuit connected to said output terminals for energization thereof in a first polarity and including said first valve and said first rectifier, a second current supplying circuit connected to said output terminals for energization thereof in a second polarity opposite to said first polarity and including said second valve and said second rectifier, a first and a second capacitor, a first and a second inductor, a load, a third circuit connecting said output terminals and including in series said capacitors and said first inductor, a fourth circuit connected in shunt with said second capacitor and including said second inductance series connected with said load, said first capacitor having a capacitance in farads of $\frac{1}{6}RW_d$, said second capacitor having a capacitance in farads of $\frac{1}{3}RW_d$, said first inductance having an inductance in henries of $9R/2W_d$, the total inductance of said second inductance and said load being not less than $R/W_d$, where R equals the resistance in ohms of said load and $W_d$ equals $2\pi$ times said first frequency in cycles per second.

References Cited in the file of this patent
UNITED STATES PATENTS

| | | |
|---|---|---|
| 2,937,298 | Puthovich et al. | May 17, 1960 |
| 2,965,856 | Roesel | Dec. 20, 1960 |
| 2,972,710 | D'Amico | Feb. 10, 1961 |
| 2,983,846 | Roesel | May 9, 1961 |